3,377,950
MATRIX MATERIAL FOR MOLDING DUPLICATE PRINTING PLATES

Vincent Squitieri, Billerica, and Dick J. Wollmar, South Lincoln, Mass., assignors to W. R. Grace & Co., Cambridge, Mass., a corporation of Connecticut
No Drawing. Continuation-in-part of application Ser. No. 330,659, Dec. 16, 1963. This application Apr. 6, 1965, Ser. No. 446,119
2 Claims. (Cl. 101—401.2)

This is a continuation-in-part of copending application Ser. No. 330,659, filed Dec. 16, 1963.

This invention relates to printing and more particularly to a matrix for molding plastic and rubber printing plates and a method of preparing such a matrix.

A matrix for the production of plastic and rubber printing plates generally comprises a base or support material impregnated with a thermosetting resin and a layer of filled, heat-curing resin. The aforementioned matrix must be capable of receiving and retaining an exact reproduction of the face of a printing form. The matrix, bearing an intaglio reproduction of the face of the printing form, can then be used to produce many identical printing plates.

In the past, matrices for the production of duplicate printing plates have been prepared from a blank comprising fibrous board or base materials which have been impregnated with a heat-curing phenolic resin, e.g., a phenol-formaldehyde resin. The face of the base material generally comprises a layer of a filled, heat-curing resin which, when subjected to the heat and pressure during the superposition of a type form against said layer, would flow and compress sufficiently to receive an impression corresponding to the face of the printing form, and then harden, maintaining the thus-formed impression.

The prior art matrices suffered from a number of drawbacks. For example, a release material, such as a silicone or graphite spray, had to be applied to the surface of the matrix prior to the formation of the duplicate plate in order to provide ready, uniform release of the duplicate plate. In the formation of the intaglio reproduction on the surface of the matrix, a certain degree of nonuniformity was introduced into the surface of the heat-cured resin. Such nonuniformity may be manifested in extreme thinness of the layer, pinholes, or breaks in the surface, particularly where sharp edges and indentations were formed in said surface and where the surface layer had been extended beyond its plastic flow limit. The rubber or plastic material of the duplicate printing plate would readily penetrate such openings in the surface and adhere or bond to the phenolic-fiber base material. When the matrix and printing plate were separated, a portion of the duplicate plate material would adhere to the matrix, thereby forming an imperfection in the duplicate plate which would become readily apparent and objectionable and in some cases unusable when the duplicate plate was made in printing. The above-described adherence of the duplicate plate material to the matrix is generally referred to as "picking." The prior art matrices were subject to warp and one dimensional shrink. The price per unit area of the matrices was also relatively high due to the high density of the matrix. The thickness was approximately 0.090 to 0.200 inch, and the compression was about 30 to 40 percent at 500 p.s.i.

A molded matrix has now been found which is not subject to the failings of the prior art materials and which also possesses a number of unexpected advantages. The laminated blank of the present invention comprises a compressible fibrous base material which has been impregnated with a thermosetting material and a surface coating or layer on one face of said base comprising a blend of at least two polymers; at least one polymer being thermoplastic and at least one being a heat cross-linkable acrylate polymer composition. The heat to accomplish the cross-linking is supplied to the blanks from the heated type face when the molded blank is formed.

Acrylate compositions which cross-link upon the action of heat are well known to the art. Such cross-linking polymers generally comprise interpolymers of acrylates such as methyl or ethyl acrylate with at least two co-monomers containing pendant reactive groups. As examples of such pendant reactive groups, mention may be made of carboxylic acid groups, hydroxyl groups, and methylolamide groups which react with other pendant groups such as epoxide or glycidyl groups. As an example of an acrylate polymer capable of internally cross-linking, mention may be made of a glycidyl acrylate/methyl methacrylate/acrylic acid copolymer. In addition to the above-described internal cross-linking mechanism, acrylate polymers may also be cured or cross-linked by the addition of an external cross-linking material to the polymer composition, e.g., the addition of formaldehyde to an acrylamide/acrylate copolymer. In the above-described cross-linking compositions, the application of heat initiates the reaction between the pendant reactive groups. Examples of other suitable cross-linking acrylates may be found in U.S. Patent Nos. 2,580,901; 2,857,354; 2,870,116; 2,870,117; and 2,931,742, and other patents.

Preferred thermoplastic polymers are polyethylene and polyurethanes.

The surface layer of the blank is, therefore, one which, during the impression by the type form, will be cross-linked by heat into a continuous film bearing a reproduction of the type form.

The thermoplastic materials, which alone would be too weak, impart flexibility to the layer while the heat cross-linkable polyacrylate imparts strength to the layer.

The combination of the thermosetting impregnant in the base and the novel surface coating of the present invention which is compatible with the impregnant permits the formation of an accurate, stable impression in the matrix with a minimization of the picking problem. The thermoplastic properties of the films permit the films to readily flow and, at the same time, maintain continuity while the impression is being made, thereby eliminating the formation of stresses and the possibility of rupture of the film layer which could lead to picking, while the cross-linking affords stabilizational strength to the structure. Such surface layers also lack porosity. The film materials of the present invention are heat stable to temperatures well in excess of temperatures normally utilized in molding duplicate plates. Therefore, the possibility of exceeding the plastic flow limit of the surface layer is remote in the present invention. The compatability of the impregnant and the surface layer provides for good adhesion and mechanical interlocking and prevents displacement or separation of the film layer on the base material thereby retaining accuracy in the reproduction even throughout the preparation of many duplicate plates. By using less dense materials, the instant matrices can be formed with only 0.080 of an inch thick, while at the same time providing approximately 50 to 60 percent compression as compared with about 30 to 40 percent for prior art materials. The shrink of the matrices of the present invention is not appreciable; therefore, distortion of the duplicate plates formed from the matrices is minimized. The resin in the base material can be cured in approximately half the time required for the prior art materials due to the use of the thinner board.

One of the most important advantages of the present invention is the self-contained release characteristics of the film layers of the present invention which makes unnecessary the use of a release compound and the attendant problems of applying a uniform and complete layer of said release compound to the matrix surface.

The preferred thermosetting resin for use in impregnating the fibrous base material is a blend of low residual phenol-formaldehyde resin and butadiene/acrylonitrile latex suspended in water. The most desirable balance of strength and flexibility has been found in the phenolic to butadiene/acrylonitrile ratio of 9 to 1. The solids (resin) to fiber ratio in the base material preferably range from 0.45 to 0.60. Other thermosetting resins known to the art, such as phenolic resins, may be used as the impregnant in the base material.

In a preferred embodiment both of the components of the polymeric system are cross-linked in order to provide an interlinking system. This may be accomplished by the addition of a cross-linking agent such as hydrazine for polyethylene. The cross-linking of polyethylene with hydrazine and other materials is described in U.S. Patent No. 3,171,830. Other cross-linking agents for polyethylene known to the art are also employed.

The matrix base material comprises a resinized paperboard consisting of a heat-curing phenolic resin and fibrous material having a solids-fiber ratio preferably ranging from 0.45 to 0.60. The fibrous material is preferably a combination of wood flour and cellulosic fibers. The base material may be formed by a process which involves the suspension of finely-divided particles of the resin in the beater of a paper machine with a substantial portion of paper pulp. This combination is then thoroughly mixed and suspended in water and the mixture is fed to a paperboard-making machine which forms the material as a sheet of comparatively low density. The sheet is then dried until the residual moisture or volatile matter is not more than about 4 percent. Such resinized paperboard is known to the art as "Premix Board" and "Rogers Board."

The base material may also be formed from a stack of impregnated soft paper or pulp. This can be accomplished by conveying uniform sheets of pressed sulfite pulp through a bath of the phenolic resin-in-water solution. When such a water solution has a solids content of about 20 to 30 percent, the viscosity is low and penetration of the pulp is sufficiently complete. The impregnated web of sulfite pulp is drawn between squeeze rolls and is then conveyed through a drying oven to evaporate the water and to give the phenolic resin a suitable precure.

The base material may also be formed by conveying a wet sheet of paper pulp through a water bath containing the phenolic resin. After penetration of the fibers of the pulp with the phenolic solutions, the sheet is pressed between squeeze rolls and then passed into an oven in order to reduce the moisture content to the desired level.

The novel surface layer of the present invention may be applied to the base material from a dispersion or solution and which is then dried to provide the film layer. Coating methods known to the art may be used in applying the dispersion, e.g., air knife coating, floating knife coating, and curtain coating. Prior to coating the base with the polymeric dispersions, it is preferable to precoat the base with a common clay or pigment binder to provide optimum coating and adhesion.

The polyethylene is preferably applied from an emulsion ranging from 20 to 50 percent solids, and has a particle size less than 0.05 micron and a viscosity ranging from 10 to 200 cps, at 25° C.

The polyurethanes are elastomeric materials which are prepared by the reaction of polyisocyanates and polyhydroxy compounds to form long chains which are then chain extended and cross-linked. The polyurethanes generally have a specific gravity ranging from 1.20 to 1.26.

The polyurethanes are also preferably employed as emulsions.

The blend of polymers is prepared by physically mixing the solutions or dispersions of the polymers.

Preferably, the thermoplastic polymer and heat cross-linkable polyacrylate are present in a 1 to 1 solids ratio; however, it should be understood that satisfactory surface layers can be prepared within the range of 5 to 1 and 1 to 5 solids ratio. The polymers are preferably coated so as to provide a 10 to 25 lbs. coating of solids per ream (3,000 sq. ft.).

The following nonlimiting examples illustrate the novel polymeric compositions suitable for preparing the novel surface layers of the present invention. The percentages are understood to be on a weight basis.

EXAMPLE 1

|  | Percent |
|---|---|
| Polyethylene (Grex 39–1, trade name for W. R. Grace & Co., New York, N.Y. aqueous polyethylene emulsion) | 50 |
| Total solids, 22%. | |
| pH, 8.9. | |
| Viscosity, 5.8 cps. at 73° F. | |
| Polyacrylate (AC–201, trade name for Rohm and Haas Co., Philadelphia, Pa., aqueous cross-linking polyacrylate emulsion) | 50 |
| Density, 1.1. | |
| Total solids, 46.7. | |
| Hydrazine | 0.5 |

EXAMPLE 2

| | |
|---|---|
| Polyurethane (Unithane D–407–JL, trade name for Thiokol Chemical Corp., Trenton, N.J., aqueous polyurethane emulsion) | 50 |
| Total solids, 40%. | |
| Polyacrylate (AC–201, trade name for Rohm and Haas Co., Philadelphia, Pa., aqueous cross-linking polyacrylate emulsion) | 50 |
| Density, 1.1. | |
| Total solids, 46%. | |

The above compositions were used to prepare blanks by coating a baseboard composed of 67% cotton linters and 33% phenol-formaldehyde resin with a 2-mil layer (dry) of the composition. Satisfactory results were achieved when the blanks were used to form a molded matrix for the production of duplicate printing plates.

It may be desirable, but it is not necessary, to add other materials such as emulsifiers or wetting agents to the coating composition in order to provide greater ease in coating the fibrous base material.

The surface layers of the present invention are 1 to 3 mils in thickness. Preferably 1 and 2 mil layers are employed. Two or more coatings may be necessary in order to provide the desired thickness. Layers in excess of 3 mils are undesirable due to excessive cost and inability to retain fine line screen reproductions with shallow relief.

In forming a matrix from a blank of the present invention, a metal type form is preheated to approximately 300 to 350° F., preferably 300° F., and placed in contact with the surface of the blank. A hydraulic press with platens heated to 300 to 350° F. holds the blank and type form forced together for a time sufficient to cure the thermosetting resin in the base material, generally around 5 minutes. The matrix bearing an exact intaglio reproduction of the face of the type form is then removed and is ready to be used in forming duplicate printing plates.

We claim:

1. A laminated blank for molding to form a matrix for the production of duplicate printing plates comprising a fibrous base material impregnated with a thermosetting resin and having on one face of said face material a polymeric layer comprising a blend of at least two polymers, at least one polymer being a cross-linkable polyethylene polymer and at least one polymer being a heat cross-linkable acrylate polymer and said blend including a cross-linking agent for said polyethylene.

2. A laminated matrix for the production of duplicate printing plates comprising a fibrous base impregnated with a thermosetting resin and a surface coating on one side of said base comprising a blend of at least two polymers, at least one polymer being a cross-linked polyethylene polymer and at least one polymer being a cross-linked acrylate polymer; said matrix bearing an intaglio reproduction of the face of a printing form.

References Cited

UNITED STATES PATENTS

| 2,509,499 | 5/1950 | Higgins | 101—401.1 XR |
| 2,580,901 | 1/1952 | Erickson et al. | 260—77.54 |
| 2,703,051 | 3/1955 | Richardson | 101—401.1 |

DAVID KLEIN, *Primary Examiner.*

ROBERT E. PULFREY, *Examiner.*

J. A. BELL, *Assistant Examiner.*